United States Patent
Podoloff

(10) Patent No.: US 10,473,539 B2
(45) Date of Patent: Nov. 12, 2019

(54) STRETCHABLE FORCE SENSOR HAVING UNDULATING PATTERNED ELECTRODES

(71) Applicant: Tekscan, Inc., South Boston, MA (US)

(72) Inventor: Robert M. Podoloff, Framingham, MA (US)

(73) Assignee: Tekscan, Inc., South Boston, MA (US)

( * ) Notice: Subject to any disclaimer, the term of this patent is extended or adjusted under 35 U.S.C. 154(b) by 184 days.

(21) Appl. No.: 15/636,099

(22) Filed: Jun. 28, 2017

(65) Prior Publication Data

US 2018/0003577 A1   Jan. 4, 2018

Related U.S. Application Data

(60) Provisional application No. 62/357,039, filed on Jun. 30, 2016.

(51) Int. Cl.
*G01L 1/22* (2006.01)
*G01L 1/20* (2006.01)

(52) U.S. Cl.
CPC ............ *G01L 1/2287* (2013.01); *G01L 1/205* (2013.01)

(58) Field of Classification Search
None
See application file for complete search history.

(56) References Cited

U.S. PATENT DOCUMENTS

| | | | |
|---|---|---|---|
| 4,734,034 A | 3/1988 | Maness et al. | |
| 4,856,993 A | 8/1989 | Maness et al. | |
| 5,010,774 A | 4/1991 | Kikuo et al. | |
| 5,612,876 A | 3/1997 | Zeidler et al. | |
| 6,531,951 B2 | 3/2003 | Serban et al. | |
| 6,996,891 B1 | 2/2006 | Raisanen | |
| 7,258,026 B2 | 8/2007 | Papakostas et al. | |

(Continued)

FOREIGN PATENT DOCUMENTS

| | | |
|---|---|---|
| DE | 4237072 C1 | 12/1993 |
| WO | WO 94/10794 A1 | 5/1994 |

(Continued)

OTHER PUBLICATIONS

[No Author Listed], Fast, Stretchy circuits could yield new wearable electronics. Tech Briefs. Jun. 14, 2016. Last Accessed on: Jul. 18, 2017. 1pg. http://www.techbriefs.com/component/content/article/1198-ntb/news/news/24783.

(Continued)

*Primary Examiner* — Peter J Macchiarolo
*Assistant Examiner* — Jermaine L Jenkins
(74) *Attorney, Agent, or Firm* — Wolf, Greenfield & Sacks, P.C.

(57) ABSTRACT

A force sensor for measuring force and/or pressures disclosed. In some embodiments, the sensor includes first and second layers, each layer having one or more electrodes arranged in a repeating, undulating pattern. Such an undulating pattern may include a serpentine pattern or a repeating v-shaped pattern. When arranged, the one or more electrodes on the first layer are placed in facing relationship and cross the one or more electrodes on the second layer to form a plurality of electrode intersections. When stretched, the one or more electrodes on the first layer move relative to the one or more electrodes on the second layer while creating new electrode intersections.

29 Claims, 10 Drawing Sheets

(56) References Cited

U.S. PATENT DOCUMENTS

| | | | | |
|---|---|---|---|---|
| 7,295,724 | B2* | 11/2007 | Wang | A61B 5/6892 |
| | | | | 385/13 |
| 7,430,925 | B2 | 10/2008 | Son et al. | |
| 9,322,121 | B2* | 4/2016 | Dunne | D05B 97/12 |
| 9,841,331 | B2* | 12/2017 | Wood | G06F 3/011 |
| 9,933,888 | B2* | 4/2018 | Kim | G06F 3/0414 |
| 10,151,649 | B2* | 12/2018 | Lewis | G01L 1/2287 |
| 2005/0003268 | A1 | 1/2005 | Scott et al. | |
| 2015/0233776 | A1* | 8/2015 | Zhe | G01L 1/146 |
| | | | | 600/592 |
| 2015/0272575 | A1 | 10/2015 | Leimbach et al. | |
| 2017/0300147 | A1* | 10/2017 | Tomita | G01L 1/205 |
| 2017/0356815 | A1* | 12/2017 | Madden | G01L 1/146 |
| 2018/0243924 | A1* | 8/2018 | Visell | B25J 13/084 |
| 2018/0303383 | A1* | 10/2018 | Connor | A61B 5/1126 |

FOREIGN PATENT DOCUMENTS

| | | |
|---|---|---|
| WO | WO 03/052368 A1 | 6/2003 |
| WO | WO 2006/055731 A1 | 5/2006 |

OTHER PUBLICATIONS

Büscher et al., Flexible and stretchable fabric-based tactile sensor. Robotics and Autonomous Systems. 2015;63:244-52.

Lu et al., Highly Sensitive Skin-Mountable Strain Gauges Based Entirely on Elastomers. Advanced Functional Materials. Oct. 2012;22(19):4044-50.

Stassi et al., Flexible Tactile Sensing Based on Piezoresistive Composites: A Review. Sensors. 2014;14:5296-332. doi:10.3390/s140305296.

Zhu et al., Self-Powered, Ultrasensitive, Flexible Tactile Sensors Based on Contact Electrification. Nano Letters. 2014;14(6):3208-13.

* cited by examiner

FIG. 1 – PRIOR ART

STRETCHABLE FORCE SENSOR HAVING UNDULATING PATTERNED ELECTRODES

RELATED APPLICATIONS

This Application claims priority under 35 U.S.C. § 119(e) to U.S. Provisional Application No. 62/357,039, entitled "STRETCHABLE FORCE SENSOR," filed on Jun. 30, 2016, which is herein incorporated by reference in its entirety.

FIELD

The disclosed embodiments are generally directed to contact sensors, and more particularly to sensors for measuring the force and/or pressure between opposing objects.

BACKGROUND

There are many types of transducers, some of which are arranged to measure forces and/or pressures. One such transducer includes a tactile sensor with an array of electrodes on each of two backing sheets, with a pressure sensitive material in between. The pressure sensitive material is responsive to an applied force and provides a measurable resistance that varies depending on the force applied on either side of the sensor. Examples of such sensors are disclosed in U.S. Pat. Nos. 4,734,034 and 4,856,993, each of which is assigned to the present assignee.

SUMMARY

According to one embodiment, a force sensor includes a first layer having one or more electrodes arranged in a repeating, first undulating pattern, and a second layer having one or more electrodes arranged in a repeating, second undulating pattern, the one or more electrodes on the second layer being placed in facing relationship with and crossing the one or more electrodes on the first layer to form one or more electrode intersections. When the sensor is stretched, the one or more electrodes on the first layer move relative to the one or more electrodes on the second layer while creating new electrode intersections.

According to another embodiment, a method of forming a force sensor includes forming one or more electrodes on a first layer, the one or more electrodes on the first layer having a repeating, first undulating pattern, forming one or more electrodes on a second layer, the one or more electrodes on the second layer having a second, undulating pattern, and placing the first layer on the second layer such that the one or more electrodes on the first layer are in facing relationship with and crossing the one or more electrodes on the second layer to form a plurality of electrode intersections. When the sensor is stretched, new electrode intersections are created as the one or more electrodes on the first layer and the one or more electrodes on the second layer move relative to one another.

According to another embodiment, a force sensor includes a first stretchable layer having one or more electrodes arranged in a repeating, first undulating pattern, and a second stretchable layer having one or more electrodes arranged in a repeating, second undulating pattern, the one or more electrodes on the second layer being placed in facing relationship with and crossing the one or more electrodes on the first layer to form one or more electrode intersections. When the sensor is stretched, the one or more electrodes on the first layer move relative to the one or more electrodes on the second layer while maintaining the one or more electrode intersections.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
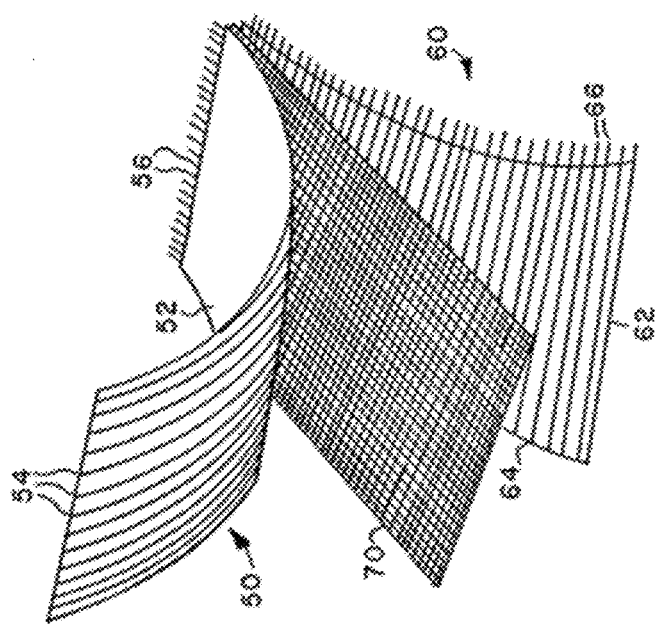
FIG. 1 shows a tactile sensor according to the prior art.

A prior art force sensor can be seen in FIG. 1, which includes a top layer 50 with a flexible backing sheet 52 and rows of electrodes 54, a bottom layer 60 with a flexible backing sheet 62 and columns of electrodes, and a separation layer 70, such as a pressure sensitive material, sandwiched in between the electrodes. The rows and columns of electrodes intersect each other (the row electrodes being perpendicular to the column electrodes) to form a plurality of electrode intersections. As will be appreciated from FIG. 1, the pressure sensitive material between the electrodes is responsive to forces applied on opposite sides of the sensor and provides a measurable resistance that varies depending on the force applied to that intersection.

The force sensor shown in FIG. 1 is capable of accurately measuring forces in situations where the forces being applied to the sensors have a small component in a direction parallel to the surface of the sensor. In situations where there are significant shear forces, however, the performance of such force sensors may be degraded. For example, when the sensor (e.g., the top and bottom layers) are stretched, such as when the sensor is placed between non-planar contacting surfaces (e.g., between a human body and a seat cushion or between an artificial hip seam and its socket), the sensors may fail because of breaking or cracking of the linear electrodes.

Applicant has recognized that by providing a sensor that can be stretched or otherwise conformed to non-planar contact surfaces without cracking or breaking of the electrodes, advantages may be realized. To that end, embodiments disclosed herein include a sensor having first and second layers, each layer having an array of electrodes with a repeating, undulating pattern, with the electrodes on the first layer arranged to move relative to the electrodes on the second layer while maintaining an overlapped or crossed arrangement between the electrodes when the sensor is stretched. In such embodiments, not only can the sensor bend to conform to an irregularly shaped surface, the sensor can also stretch within the same plane as the unstretched sensor (e.g., along a longitudinal axis, a lateral axis, or a combination thereof). The sensor also may stretch out of a plane of the unstretched sensor.

As will be appreciated, the electrodes on the first layer are arranged in facing relationship to and crossing the electrodes on the second layer such that a plurality of electrode intersections are formed. As will be described, stretching of the sensor also causes stretching and lengthening of the electrodes on at least one of the first and second layers. As a result, electrodes on the first and second layers may intersect at a first intersection point when the sensor is in an unstretched configuration and may thereafter intersect at a second intersection point, different from the first intersection point, when the sensor is stretched.

In some embodiments, the electrodes on the first layer may cross the electrodes on the second layer at an angle. In some embodiments, the electrodes on each of the top and bottom layers are arranged in a serpentine configuration. The electrodes also may be arranged with a repeating, v-shaped pattern (e.g., as a triangular waveform) or in another regularly repeating, undulating pattern (e.g., as a square or sawtooth waveform). Without wishing to be bound by theory, such a repeating, undulating pattern of the electrodes may allow the electrodes to better accommodate a deformation (e.g., stretching) of the top and bottom layers.

In some embodiments, the arrangement of the electrodes allows the sensors to be stretched between about 20% and 30% from its unstretched or at-rest arrangement. In this regard, the electrodes straighten as the sensor is stretched in a direction along the length of the electrode. As will be appreciated, in such embodiments, the top and bottom layers may include a backing sheet formed of a stretchable material. For example, the backing sheet may include a rubber material, such as a thin rubber sheet. The backing sheet also may be formed of a plastic film, such as a polyester or polyamide, as well as fabrics such as nylon and vinyl. Other stretchable materials also may be used to form the backing sheet in other embodiments.

In some embodiments, a highly flexible electrode may be applied to the stretchable backing sheet. In such embodiments, the flexible electrode may include a composite containing conductive particles and a highly flexible polymer material. Such a material may be able to be stretched to over 100% of its initial dimensions without the loss of electrical conductivity. Such a material also may be able to survive bending and flexing without cracking or flaking of the material.

In some embodiments, a pressure sensitive material is positioned between the electrodes at each intersection. In such embodiments, the pressure-sensitive material may be a resistive material arranged to measure the force applied on opposite sides of the sensor. That is, the pressure sensor material may be responsive to forces applied on opposite sides of the sensors (e.g., on opposite sides of the first and second layers) and may provide a measurable resistance that varies depending on the force applied at that intersection. In this regard, the resistance of the resistive material, together with the intersecting electrodes, forms a sensor cell (also referred to as a senscel) that is responsive to the applied force. As the force increases, resistance between the electrodes changes, usually decreasing. This change in resistance is measured, with the measured resistance being used to determine the corresponding force that was applied at the intersecting location.

In some embodiments, a flexible adhesive layer may be applied between the layers, such as on one or both of the facing sides of the layer(s) to secure the layers together. In some embodiments, the adhesive layer may be applied in a pattern which provides passages where the adhesive layer does not exist. Such passages may allow air to escape from interior areas of the assembled sensor.

In some embodiments, the thickness of the adhesive layer may be arranged to permit pre-loading or to provide a threshold level for the sensor. In such embodiments, the adhesives may be placed in empty spaces between adjacent electrodes. In embodiments in which the adhesive is thinner than a thickness of the electrodes (e.g., thinner than an ink used to create the electrodes), the first and second layers may be pulled together, creating a pre-load on each electrode intersections. In embodiments in which the adhesive is thicker than the thickness of the electrodes, the adhesive will keep the first and second layers spaced apart, with the layers having to be pushed together, such as with a threshold force, so that the crossing electrodes contact one another.

Figure 2:
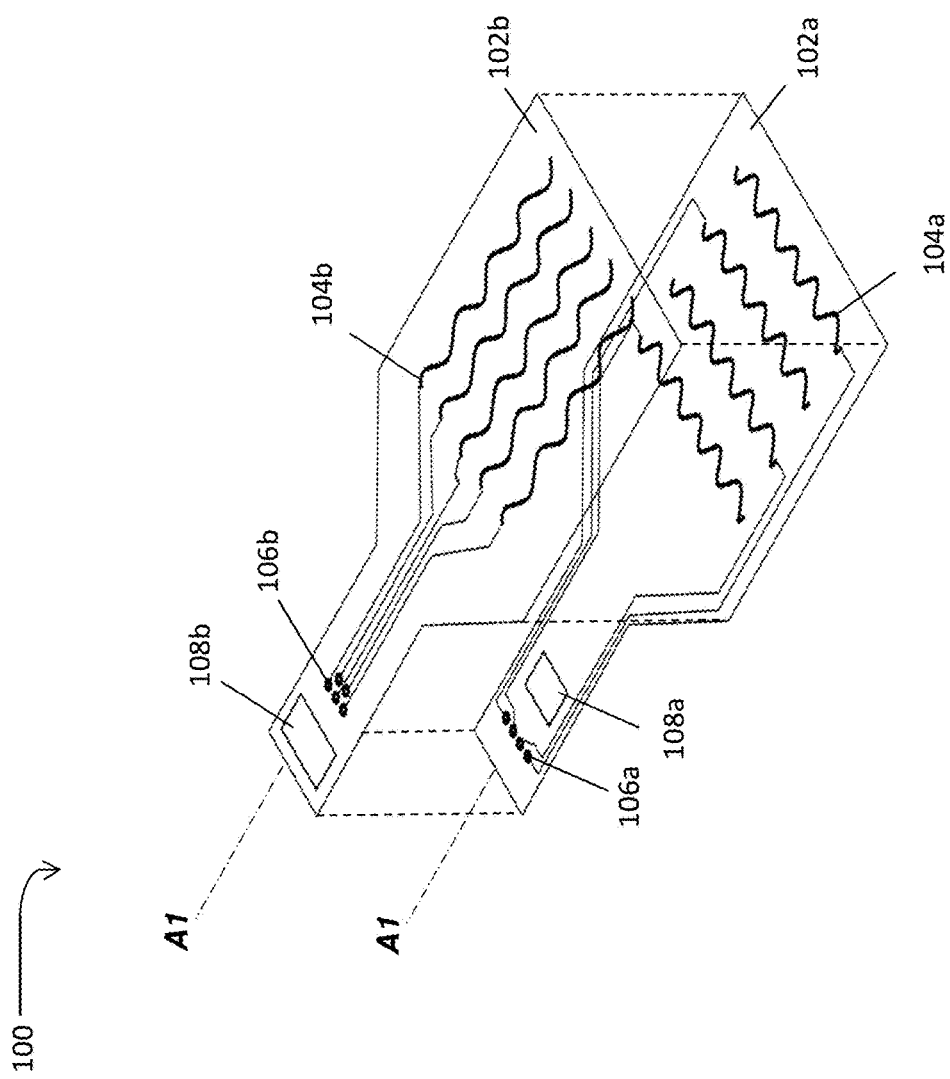
FIG. 2 shows an exploded perspective view of a tactile sensor according to one embodiment.
Figure 3:
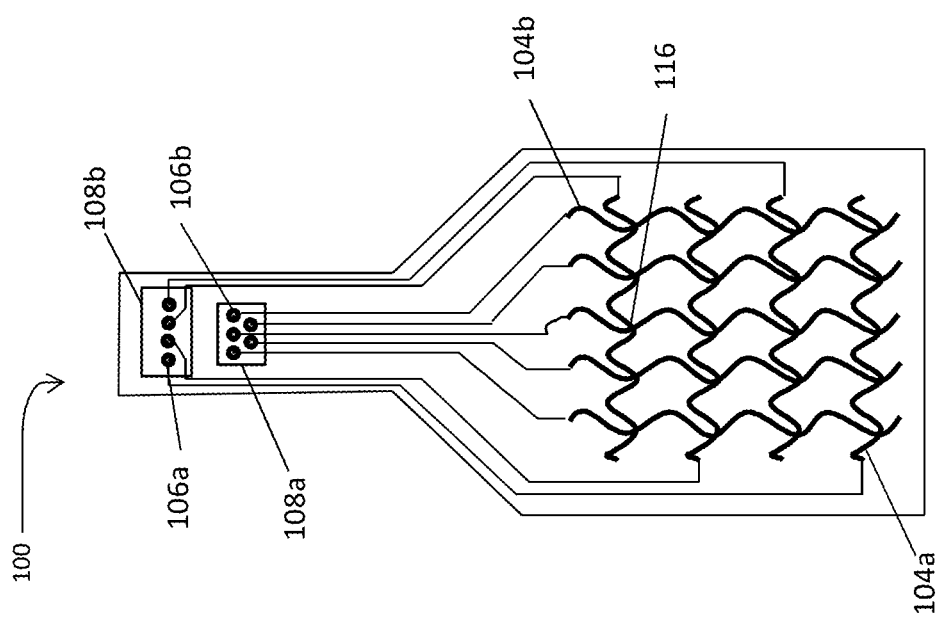
FIG. 3 shows a plan view of the tactile sensor of FIG. 2 in an assembled position.

Turning now to FIGS. 2 and 3, which show a tactile sensor 100 according to the present disclosure. As will be appreciated, FIG. 3 shows the sensor 100 of FIG. 2 in an assembled, unstretched, state. In some embodiments, as shown in FIG. 2, the sensor 100 includes a first layer 102*a* having one or more rows of electrodes 104*a*, and a second layer 102*b* having one or more columns of electrodes 104*b*. In such embodiments, each of the row electrodes are substantially parallel to one another, and each of the column electrodes are generally parallel to one another.

Although the first layer is shown as having rows of electrodes and the second layer is shown as having columns of electrodes, it will be appreciated that in other embodiments, the first layer may have columns of electrodes and the second layer may have rows of electrodes. It will also be appreciated that the electrodes need not be arranged in columns and rows. For example, the electrodes may be arranged at an angle (e.g., at a forty five degree angle) with respect to the longitudinal axis A1 of each of the first and second layers such that each pair of intersecting electrodes forms an X. In the present arrangement, the row and column electrodes 104*a*, 104*b* are perpendicular and parallel to the longitudinal axis A1, respectively.

As will be appreciated, the number of column electrodes and the number of row electrodes need not be the same. For example, as shown in FIG. 2, there may be four row electrodes 104*a* on the first layer 102*a* and five column electrodes 104*b* on the second layer 104*a*. In other embodiments, the number of electrodes may be the same on the first and second layers. The first layer also may have more row electrodes than column electrodes on the second layer.

Turning now to FIG. 3, the sensor 100 is shown in an assembled, unstretched position. As illustrated in this figure, when the first and second layers are placed on top of one another and the row electrodes 104*a* on the first layer are placed in facing relationship with and crossing the column electrodes 104*b* on the second layer, a plurality of electrode intersections 116 are created. Such electrode intersections create a grid-like matrix of intersections. Each intersection defines a location of a sensor cell, which, as described, is responsive to force.

According to one aspect, the electrodes on each of the first and second layers are formed with a repeating, undulating pattern. For example, as shown in FIGS. 2 and 3, the electrodes may include a serpentine pattern, with electrodes that are generally sinusoidal in nature. In some embodiments, the amplitude of each peak of one of the electrodes 104*a*, 104*b* may be the same across the electrode. In some embodiments, the amplitude of each peak may vary from peak to peak. For example, the amplitude of the peaks in a central region of the sensor may be smaller than an amplitude of the peaks in the outer areas of the sensor. Without wishing to be bound by theory, the amplitude of the peaks of the electrode may be varied in order to allow the electrode to tolerate more or less deformation of first and second layers. For example, peaks having a larger amplitude may be capable of stretching more than peaks having a smaller amplitude when the sensor is stretched. As will be appreciated, in such embodiments, the strechability of the backing sheet of the first and second layers also may be varied. For example, a section of the backing sheet having peaks with larger amplitudes may be more stretchable than a section of the backing sheet having peaks with smaller amplitudes.

Figure 4:
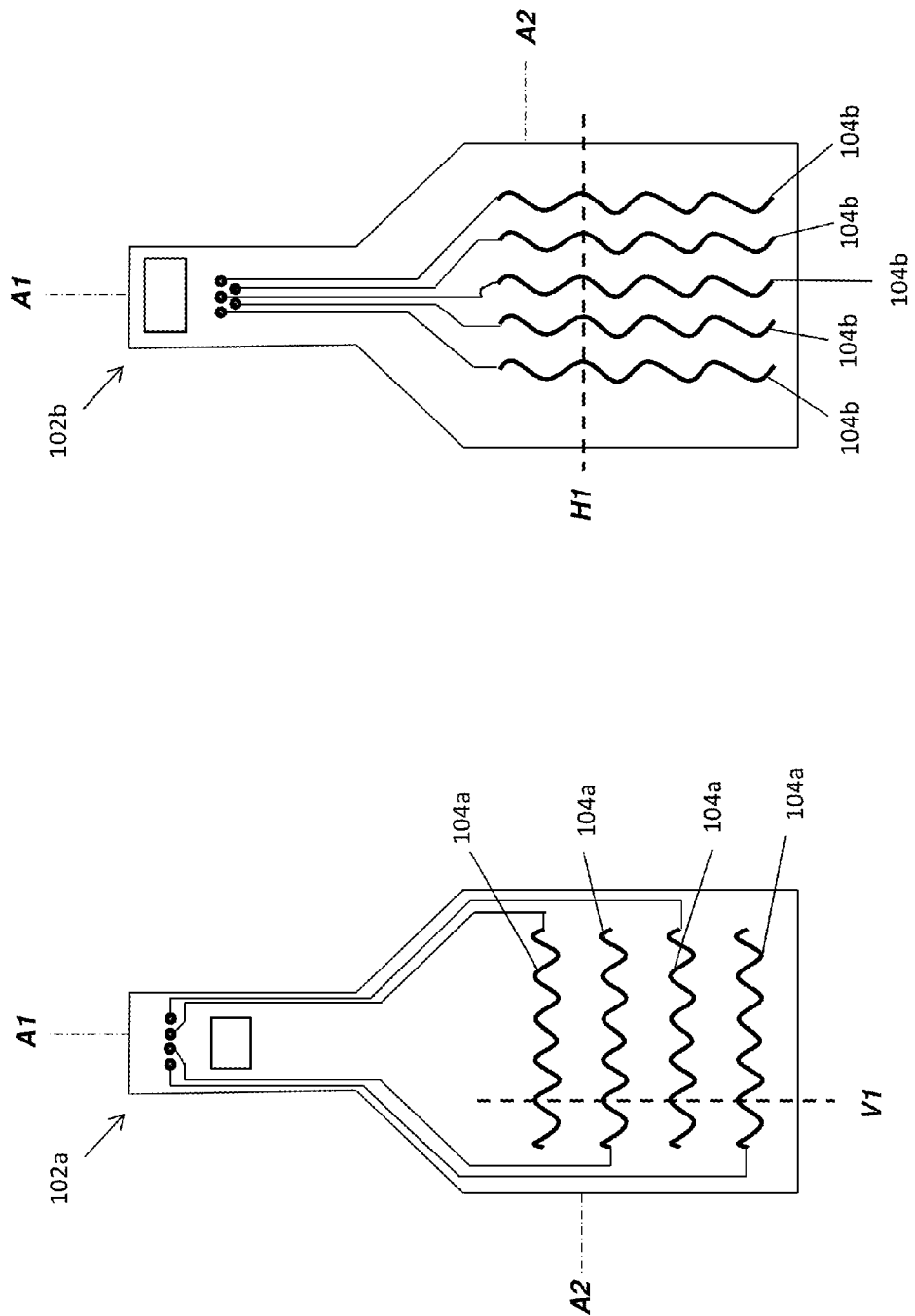
FIGS. 4A and 4B illustrate plan views of first and second layers of the tactile sensor of FIG. 3.

In some embodiment, as shown in FIGS. 4A-4B, the electrodes are arranged such that the peaks of each of the row electrodes are aligned on the first layer and the peaks of each of the column electrodes on the second layer are aligned. For example, as shown in FIG. 4A, each of the first peaks of the row electrodes 104*a* of the first layer 102*a* intersect the vertical line labeled V1. The second, third, and fourth peaks also may intersect respective vertical lines, not shown. In such embodiments, the vertical lines are parallel to the longitudinal axis A1 of the first and second layer. As will be further appreciated, the valleys of each of the row electrodes also may be aligned.

In a similar fashion, as shown in FIG. 4B, the first peak of each of the column electrodes 104*b* of the second layer 102*b* may intersect a horizontal line labeled H1. The rest of the peaks also may be similarly aligned and may intersect respective horizontal lines, not shown. Such horizontal lines may be parallel to the lateral axis A2. Although not shown, the valleys of each of the column electrodes also may be aligned.

In some embodiments, the peaks of the column electrodes may be arranged to intersect with the valleys of the row electrodes. In a similar fashion, the peaks of the row electrodes may be arranged to intersect with the valleys of the column electrodes. In other arrangements, the peaks or valleys of the row and column electrodes may be arranged to intersect one another. For example, as shown in FIG. 3, the valleys of the column electrodes intersect the valleys of the row electrodes.

In some embodiments, the alignment between the peaks of the row electrodes and column electrodes may create a uniform grid-like matrix of electrode intersections. In some embodiments, such a uniform grid-like matrix of electrode intersections may allow the sensor to be able to stretch uniformly in all direction.

Although each of the electrodes on the first and second layers are shown as having a serpentine configuration, it will be appreciated that the electrodes also may be formed with a repeating v-shaped pattern or another repeating, undulating patter (e.g., a square or sawtooth waveform). As will be further appreciated, the undulating pattern of each electrode need not be the same across each of the first and second layers or even within a single row or column. For example, the first layer may have three electrodes with serpentine pattern and two electrodes with a repeating v-shaped pattern. Turning back to FIG. 2, in some embodiments, each of the electrodes 104*a*, 104*b*, are connected to respective connection pads 106*a*, 106*b* on the first and second layers, respectively. As will be appreciated, the connection pads 106*a*, 106*b* are used to make electrical contact with the electrodes, such as with a connector attached to a multiconductor cable (not shown). As shown in FIG. 2, windows 108*a*, 108*b* may be cut into the first and second layers 102*a*, 102*b*, respectively, to allow access to the connection pads 106*a*, 106*b* when the sensor is in the assembled configuration. As will be appreciated, such access to the connection pads may allow electrical contact to be made with the electrodes.

Figure 5:
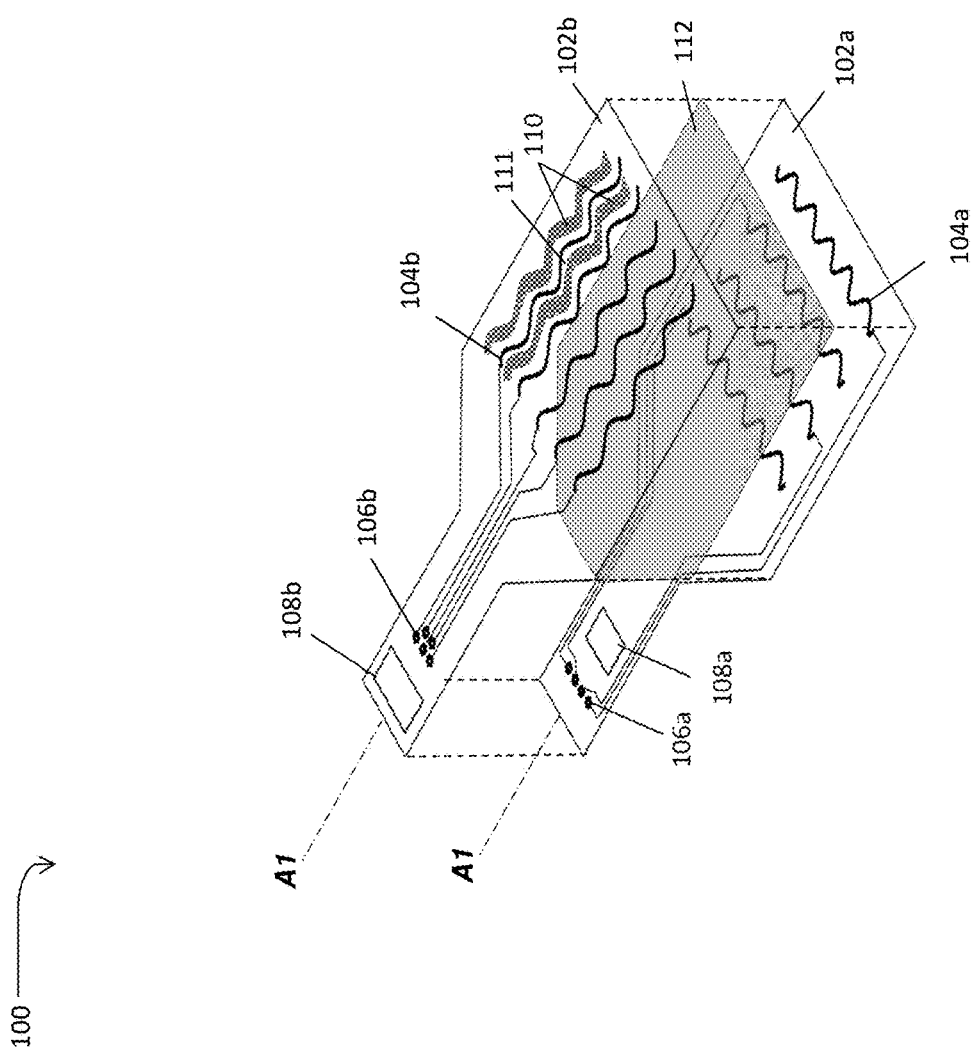
FIG. 5 shows an exploded perspective view of a tactile sensor according to another embodiment.

Turning now to FIG. 5, in some embodiments, an adhesive 110 may be applied to at least one facing side of the first and second layers of the sensor, shown in this figure as the facing side of the second layer 102*b*, to secure the electrodes on the first layer in a facing relationship with the electrodes on the second layer. As will be appreciated, the adhesive may be placed in any suitable position, such as in an area outside of the electrode intersections. For example, the adhesive may be positioned in between adjacent electrodes or outside of the electrode matrix. In some embodiments, the adhesive may be positioned in between every set of adjacent electrodes, although the adhesive also may be positioned between only one set of adjacent electrodes. In some embodiments, as is shown, the adhesive may be positioned outside only one side of the electrode matrix, although the adhesive may be positioned along more than one side. As will be further appreciated, although the adhesive is shown on only the second layer, the adhesive may be applied to only the first layer or to both the first and second layers.

Figure 6A:
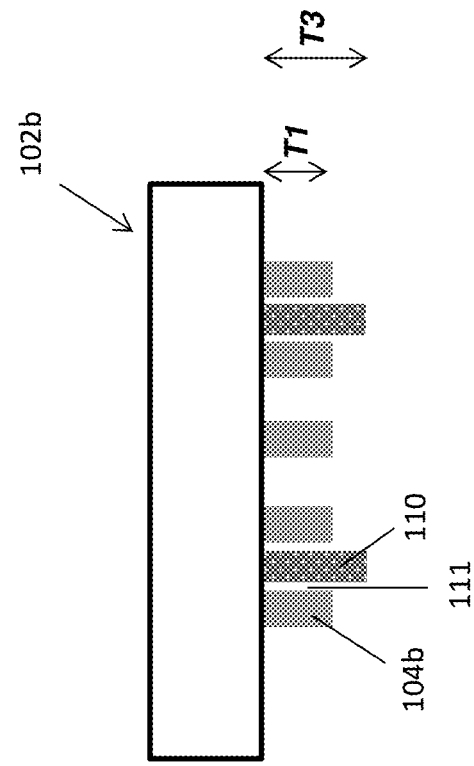
FIGS. 6A and 6B illustrate enlarged cross-sectional side views of a tactile sensor having adhesives applied to a second layer, according to various embodiments.
Figure 6B:
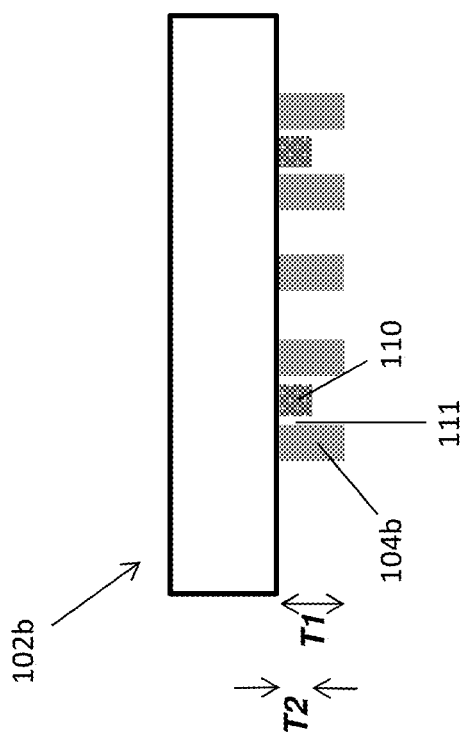

In some embodiments, as shown in FIGS. 5 and 6A-6B, the adhesive is applied in a pattern which provides passages 111 where the adhesive layer is not applied. Such passages may allow air to escape from interior areas of the electrode sets. In some embodiments, the adhesive is flexible such that it may deform with stretching of the sensor.

In some embodiments, as shown in FIG. 6A-6B, the adhesive may have a thickness that differs from a thickness of the electrode to permit pre-loading or to provide a threshold level for the sensor. For example, as shown in FIG. 6A, the thickness T1 of the electrode 104*b* may be greater than a thickness T2 of the adhesive 110. In such embodiments, the adhesive may cause the first and second layers to be pulled together, creating a pre-load at each intersection. In some embodiments, as shown in FIG. 6B, the thickness T1 of the electrode 104*b* may be less than a thickness T3 of the adhesive 110. In such embodiments, the thicker adhesive may keep the first and second layers spaced apart, with the layers having to be pushed together, such as with a threshold force, before making contact between the electrodes or if used before the pressure sensitive material is acted upon. As will be appreciated, in other embodiments, the thickness of the electrode may be the same as the thickness of the electrode.

Turning back to FIG. 5, in some embodiments, a pressure-sensitive material 112 is positioned between electrodes 104*a*, 104*b* on the first and second layers 102*a*, 102*b*, respectively. As will be appreciated, the pressure-sensitive material may have any suitable shape. In such embodiments, the pressure sensitive material 112 may be a resistive material. As described, the pressure sensitive material may be responsive to forces applied on opposite sides of the sensor (e.g., on opposite sides of the first and second layers—for example, an applied force and a reaction force) and provide a measurable resistance that varies depending on the force applied at each of the electrode intersections.

Figure 7:
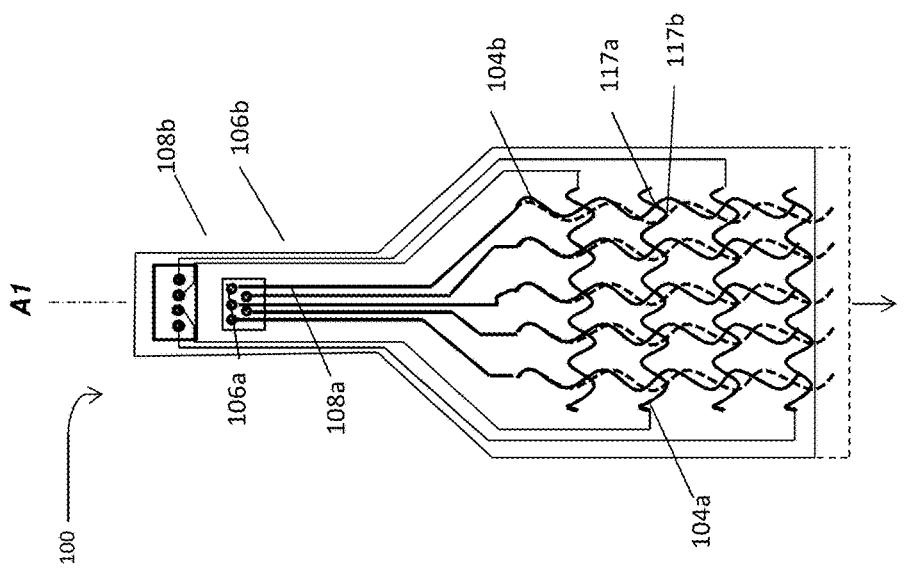
FIG. 7 shows a plan view of the tactile sensor of FIG. 3, with a first stretched position shown in dashed lines.
Figure 8:
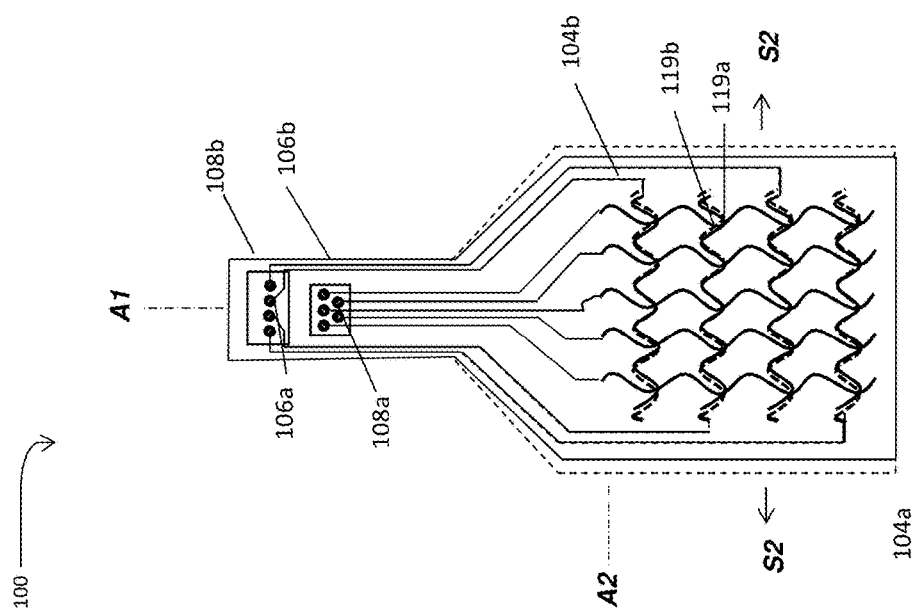
FIG. 8 shows a plan view of the tactile sensor of FIG. 3, with a second stretched position shown in dashed lines.

According to another aspect, the electrodes on the first and second layers are arranged move relative to one another when the sensor is stretched. Such behavior is illustrated in FIGS. 7 and 8, which show the sensor 100 in two different stretched configurations. In one example, as illustrated in FIG. 7, the sensor may be stretched along the longitudinal axis A1, in a direction shown by the arrow labeled S1. As will be appreciated, the dashed lines in this figure represent the stretched state of the sensor and electrodes whereas the solid lines represent the unstretched state. In use, as the sensor is stretched, the columns of electrodes are also stretched in the direction S1, along the length of the electrode, which may cause the column electrodes to increase in length.

As also illustrated in FIG. 7, as the columns of electrodes are stretched and moved relative to the rows of electrodes, the points of intersection between the electrodes on the first and second layers change. That is, in the unstretched state, the electrodes may overlap at first intersection point 117a and, after the sensor is stretched, the electrodes may overlap at a second intersection point 117b, the first and second intersection points being different from one another. As will be appreciated, in both the unstretched and stretched state, the intersection points 117a, 117b are responsive to forces applied on opposite sides of the sensor and provide a measurable resistance that varies depending on the force applied at the intersection points.

FIG. 8 illustrates an example in which the sensor is stretched along a lateral axis A2, as noted by the arrows labeled S2. As will be appreciated, although the sensor is shown as being stretched in two directions in FIG. 8, in other embodiments, the sensor may be stretched in only one direction. Similar to the sensor shown in FIG. 7, the electrodes on the first and second layers are also arranged to move relative to one another in the sensor shown in FIG. 8. However, in the embodiment in FIG. 6, the row electrodes are being stretched and lengthened in one or more directions S2, along the length of the electrode.

As also illustrated in FIG. 8, as the row electrodes are stretched and moved relative to the columns of electrodes, the intersection points between the electrodes on the first and second layers change. For example, in the unstretched configuration, the electrodes intersect at a first intersection point 119a, and in the stretched configuration, the electrodes intersect at a second intersection point 119b. As with other embodiments, in both the unstretched and stretched state, the intersection points 119a, 119b are responsive to forces applied on opposite sides of the sensor and provide a measurable resistance that varies depending on the force applied at each of the electrode intersections As will be appreciated, the difference in location between the first and second intersection points may vary depending upon the amount to which the sensor is stretched, the magnitude of the amplitude of the electrode, and the position of the electrode on the sensor. For example, the greater the peak amplitude, the more the electrode may be able to stretch. In a similar fashion, the more the sensor and electrode are stretched, the larger the displacement between the first and second intersection points. As will be further appreciated, in embodiments in which the sensor is only stretched a small amount, the first and second intersection points also may appear to be at the same location.

Without wishing to be bound by theory, by arranging the first and second layers such that the electrodes may move relative to one another while maintaining an overlap between the electrodes and providing a measurable resistance that varies depending upon the force applied at each intersection, the sensor may provide a high tolerance. For example, the sensor may be able to continue measuring force irrespective of where the second intersection point is located.

Although FIGS. 7 and 8 show the sensor being stretched along only one of the longitudinal and lateral axes, it will be appreciated that the sensor also may be stretched in both directions in other embodiments. For example, both the column and row of electrodes may be stretched along the longitudinal and lateral axes, respectively, causing the row and column electrodes to lengthen as they move relative to one another. As will be further appreciated, although the sensor is shown as being stretched in the plane of the sensor, the sensor also may be stretched in a direction outside of the plane of the sensor. For example, the sensor may be stretched in a direction out of the page or into the page. In such embodiments, the row and column electrodes may stretch according to the direction of movement of the sensor. As with other embodiments, the plurality of electrode intersections between the column and row electrodes are changed as the electrodes move relative to one another.

Figure 9A:
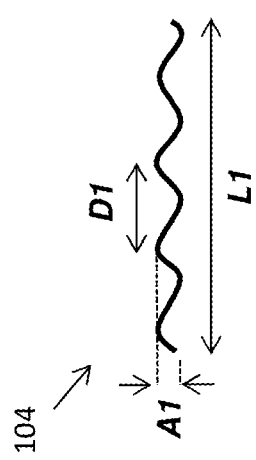
FIGS. 9A and 9B show illustrative electrodes in unstretched and stretched positions, respectively, according to another embodiment.
Figure 9B:
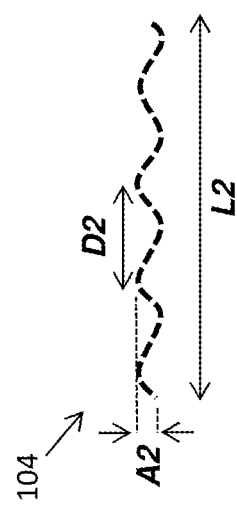

FIGS. 9A and 9B illustrate a representative electrode 104 that is deformed (e.g., stretched) during stretching of the sensor. As illustrated in these figures, when the electrode is stretched (see FIG. 9B), a length of the electrode may increase from a first, unstretched length L1 (see FIG. 9A) to a second, stretched length L2. As also illustrated in this figure, a distance between the peaks in the electrode also may increase from a first, unstretched distance D1 to a second, stretched distance D2. In some embodiments, this stretching also may cause an amplitude of the electrode to decrease from a first amplitude A1 to a second amplitude A2 as the electrode is stretched.

Although the electrode has been shown and described as having electrode intersections that change from a first intersection to a second intersection when the sensor is stretched, it will be appreciated that the intersection point may stay the same. For example, the electrode intersection may be maintained as the sensor is stretched. In such embodiments, the intersection point may be maintained as the electrodes deform in response to the sensor stretching. In some embodiments, the electrodes on the first and second layers may be fixed at the intersection point such that deformation (e.g., stretching) of the electrodes occurs in between each intersection.

According to another aspect, a method of manufacturing a force sensor is disclosed. As will be appreciated from the embodiments shown in FIGS. 2 and 5, in some embodiments, the first and second layers are formed on first and second backing sheets, respectively, with the rows and columns of electrodes being deposited (e.g., printed or etched) on the respective layer. Next, the pressure sensitive material 112 may be placed on one of the first and second layers, followed by placement of the other of the first and second layers. Once the first and second layers are aligned, the electrodes 104a on the first layer 102a are positioned in facing relationship and crossing the electrodes 104b on the second layer 102b. In embodiments in which an adhesive is used, the adhesive 110 may be applied to one or both of the first and second layers prior to aligning the first and second layers. In such embodiments, the adhesive may be applied to an area outside of the area of the electrodes.

In some embodiments, one or both of the first and second layers may include an alignment feature, such as a printed or pre-cut alignment feature (e.g., a hole or fiducial), which may allow accurate registration between the first and second layers during assembly.

Figure 10:
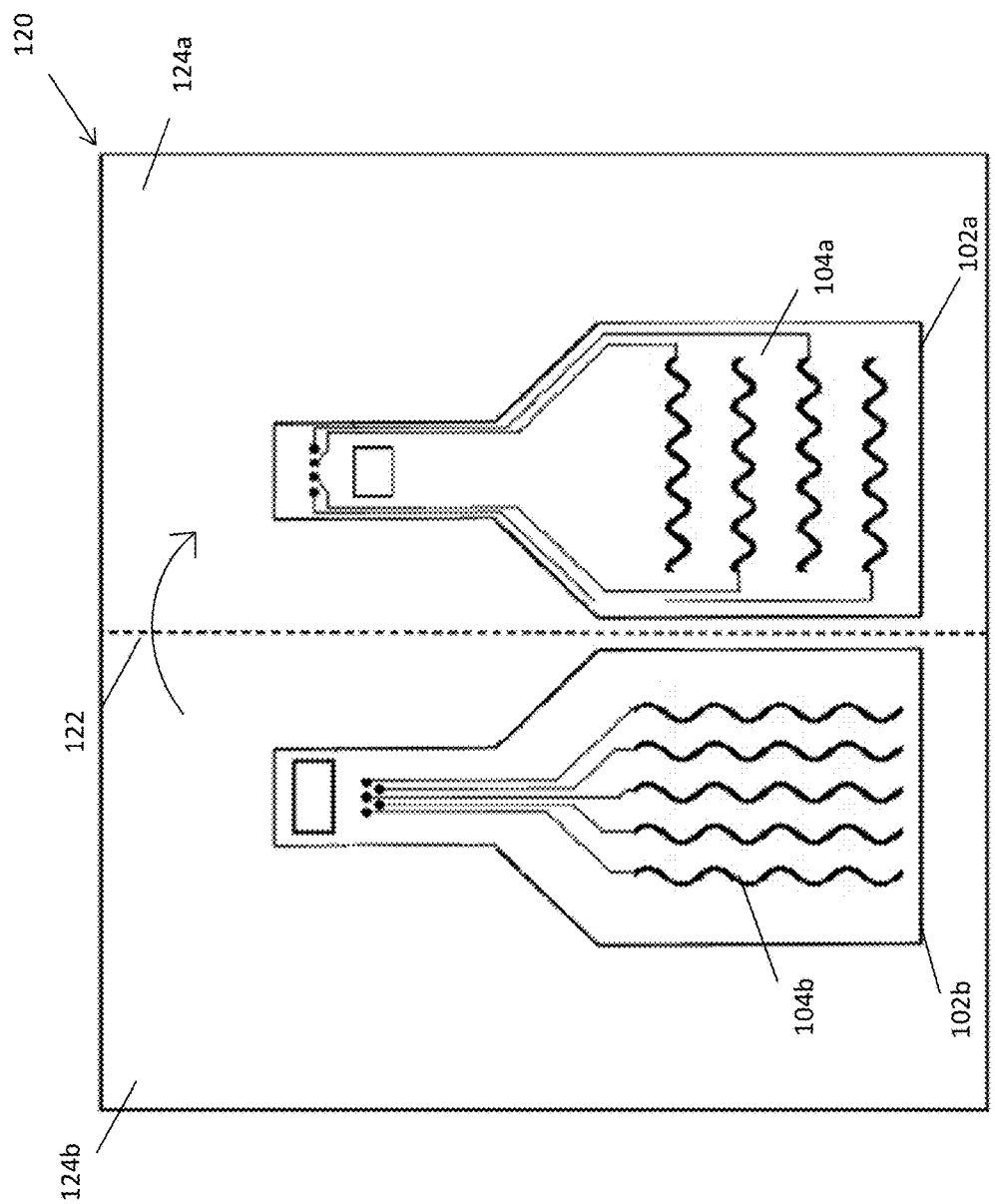
FIG. 10 illustrates a method of manufacturing a tactile sensor, according to one embodiment.

In other embodiments, as shown in FIG. 10, instead of forming the first and second layers on separate backing sheets, both the first and second layers 102a, 102b may be deposited on a single backing sheet 120. As shown in FIG. 10, the backing sheet 120 is formed with a perforated fold line 122, with the first and second layers being deposited relative to the fold line 122. As will be appreciated, the first and second layers 102a, 102b are positioned relative to the fold line 122 such that when the first and second halves 124a, 124b of the backing sheet are aligned when the backing sheet is folded on the fold line, the first and second layers will also be aligned.

Next, as with other embodiments, the rows and columns of electrodes 104a, 104b may be deposited (e.g., printed or etched) on the first and second layers 102a, 102b, respectively. A pressure sensitive material 112 is then placed on one of the first and second layers, after which point the backing sheet is folded along the fold line to align the first and second halves 124a, 124b of the backing sheet and the first and second layers 102a, 102b of the sensor. In embodiments in which an adhesive material is used, such an adhesive material may be placed on one or both of the facing sides of the first and second layers before placing the pressure sensitive material and folding the backing sheet. As with other embodiments, the backing sheet also may include printed or pre-cut alignment features (e.g., fiducials or holes) to allow accurate registration of the first and second layers.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A force sensor comprising:
a first layer having one or more electrodes arranged in a repeating, first undulating pattern; and
a second layer having one or more electrodes arranged in a repeating, second undulating pattern, the one or more electrodes on the second layer being placed in facing relationship with and crossing the one or more electrodes on the first layer to form one or more electrode intersections;
wherein, when the sensor is stretched, the one or more electrodes on the first layer move relative to the one or more electrodes on the second layer while creating new electrode intersections.

2. The force sensor of claim 1, wherein:
the one or more electrodes on the first layer include a first electrode and the one or more electrodes on the second layer include a second electrode;
in an unstretched state, the first and second electrodes intersect at a first intersection point; and
in a stretched state, the first and second electrodes intersect at a second intersection point, the second intersection point being different from the first intersection point.

3. The force sensor of claim 1, wherein the first undulating pattern is the same as the second undulating pattern.

4. The force sensor of claim 1, wherein the first and second undulating patterns are different.

5. The force sensor of claim 1, wherein the first and second undulating patterns are a serpentine pattern.

6. The force sensor of claim 1, further comprising a pressure sensitive material placed in between the one or more electrodes on the first layer and the one or more electrodes on the second layer.

7. The force sensor of claim 1, further comprising an adhesive placed on at least one of the first and second layers to maintain the facing relationship of the one or more electrodes on the first layer and the one or more electrodes on the second layer.

8. The force sensor of claim 1, wherein the one or more electrodes on the first layer include first and second electrodes, the first and second electrodes being substantially parallel to one another.

9. The force sensor of claim 1, wherein the one or more electrodes on the second layer include third and fourth electrodes, the third and fourth electrodes being substantially parallel to one another.

10. The force sensor of claim 1, wherein, when the force sensor is stretched in a first direction, the one or more electrodes on the first layer are stretched in the first direction and moved relative to the one or more electrodes on the second layer.

11. The force sensor of claim 10, wherein the first undulating pattern is a serpentine pattern and wherein, when the one or more electrodes on the first layer are stretched, a distance between adjacent peaks of the one or more electrodes on the first layer increases.

12. The force sensor of claim 1, wherein, when the force sensor is stretched in a second direction, the one or more electrodes on the second layer are stretched in the second direction and moved relative to the one or more electrodes on the first layer.

13. The force sensor of claim 12, wherein the second undulating pattern is a serpentine pattern and wherein, when the one or more electrodes on the second layer are stretched in the second direction, a distance between adjacent peaks of the one or more electrode of the second layer increases.

14. The force sensor of claim 1, wherein the one or more electrodes on the first layer are arranged in rows and the one or more electrodes on the second layer are arranged as columns.

15. The force sensor of claim 1, further comprising first and second connection pads for establishing electric contact with the one or more electrodes on the first and second layers, respectively.

16. A method of forming a force sensor comprising:
    forming one or more electrodes on a first layer, the one or more electrodes on the first layer having a repeating, first undulating pattern;
    forming one or more electrodes on a second layer, the one or more electrodes on the second layer having a second, undulating pattern; and
    placing the first layer on the second layer such that the one or more electrodes on the first layer are in facing relationship with and crossing the one or more electrodes on the second layer to form a plurality of electrode intersections, wherein, when the sensor is stretched, new electrode intersections are created as the one or more electrodes on the first layer and the one or more electrodes on the second layer move relative to one another.

17. The method of claim 16, further comprising applying an adhesive to at least one of the first and second layers before the step of placing the first layer on the second layer.

18. The method of claim 16, further comprising placing a pressure sensitive material on the second layer before the step of placing the first layer on the second layer.

19. The method of claim 16, wherein:
    the step of forming one or more electrodes on the first layer includes forming one or more electrodes on the first layer on a first half of a backing sheet;
    the step of forming one or more electrodes on the second layer includes forming one or more electrodes on the second layer on a second half of the backing sheet; and
    before the step of placing the first layer on the second layer, folding the backing sheet along a fold line between the first and second halves.

20. A force sensor comprising:
    a first stretchable layer having one or more electrodes arranged in a repeating, first undulating pattern; and
    a second stretchable layer having one or more electrodes arranged in a repeating, second undulating pattern, the one or more electrodes on the second layer being placed in facing relationship with and crossing the one or more electrodes on the first layer to form one or more electrode intersections;
    wherein, when the sensor is stretched, the one or more electrodes on the first layer move relative to the one or more electrodes on the second layer while maintaining the one or more electrode intersections.

21. The force sensor of claim 20, wherein the first undulating pattern is the same as the second undulating pattern.

22. The force sensor of claim 20, wherein the first and second undulating patterns are different.

23. The force sensor of claim 20, wherein the first and second undulating patterns are a serpentine pattern.

24. The force sensor of claim 20, further comprising a pressure sensitive material placed in between the one or more electrodes on the first layer and the one or more electrodes on the second layer.

25. The force sensor of claim 20, further comprising an adhesive placed on at least one of the first and second layers to maintain the facing relationship of the one or more electrodes on the first layer and the one or more electrodes on the second layer.

26. The force sensor of claim 20, wherein the one or more electrodes on the first layer include first and second electrodes, the first and second electrodes being substantially parallel to one another.

27. The force sensor of claim 20, wherein the one or more electrodes on the second layer include third and fourth electrodes, the third and fourth electrodes being substantially parallel to one another.

28. The force sensor of claim 20, wherein the one or more electrodes on the first layer are arranged in rows and the one or more electrodes on the second layer are arranged as columns.

29. The force sensor of claim 20, further comprising first and second connection pads for establishing electric contact with the one or more electrodes on the first and second layers, respectively.

* * * * *